United States Patent

Lazzari et al.

[11] Patent Number: 5,508,862
[45] Date of Patent: Apr. 16, 1996

[54] SLIDER WITH AN IMPROVED PROFILE

[75] Inventors: Jean-Pierre Lazzari, Corenc; Christian Pisella, Rives sur Fure, both of France

[73] Assignees: Commissariat a l'Energie Atomique, Paris; Silmag, Grenoble, both of France

[21] Appl. No.: 296,909

[22] Filed: Aug. 31, 1994

[30] Foreign Application Priority Data

Sep. 6, 1993 [FR] France ................................. 93 10559

[51] Int. Cl.$^6$ ............................................. G11B 5/60
[52] U.S. Cl. ............................................... 360/103
[58] Field of Search ................................. 360/103, 104

[56] References Cited

U.S. PATENT DOCUMENTS

| | | |
|---|---|---|
| 3,488,648 | 1/1970 | Church . |
| 4,673,996 | 6/1987 | White . |
| 4,698,716 | 10/1987 | Lazzari ........................... 360/105 |
| 4,911,964 | 3/1990 | Corbo et al. .................... 428/40 |
| 4,984,114 | 1/1991 | Takeuchi et al. ............... 360/103 |
| 5,267,108 | 11/1993 | Tani ................................ 360/103 |
| 5,274,518 | 12/1993 | Chapin et al. .................. 360/103 |
| 5,377,063 | 12/1994 | Taniguchi et al. .............. 360/103 |

FOREIGN PATENT DOCUMENTS

| | | |
|---|---|---|
| 0458444 | 11/1991 | European Pat. Off. . |
| 0543690 | 5/1993 | European Pat. Off. . |
| 3105778 | 5/1991 | Japan ............................. 360/103 |

OTHER PUBLICATIONS

Patent Abstracts of Japan, vol. 16, No. 243 (P-1364), Jun. 4, 1992, JP-A-04 053 075, Feb. 20, 1992.
Patent Abstracts of Japan, vol. 17, No. 369 (P-1572), Jul. 12, 1993, JP-A-05 054 580, Mar. 5, 1993.
Patent Abstracts of Japan, vol. 17, No. 314 (P-1557), Jun. 15, 1993, JP-A-05 028 685, Feb. 5, 1993.

Primary Examiner—Stuart S. Levy
Assistant Examiner—Allen Cao
Attorney, Agent, or Firm—Oblon, Spivak, McClelland, Maier & Neustadt

[57] ABSTRACT

A slider for magnetic recording includes at least one ski with a front portion and a rear portion, a read and/or write head located at the rear portion of the slider, the front portion of each ski having first and second steps with, respectively, first and second risers. The first riser of the first step forms with a longitudinal direction of the ski a first angle of between approximately 10° and approximately 60° and the second riser of the second step forms with the longitudinal direction of the ski a second angle which differs from the first angle and is between approximately 20° and approximately 80°. The height of the first riser is between approximately 20 nm and approximately 200 nm and the height of the second riser is between approximately 200 nm and approximately 2 μm.

4 Claims, 4 Drawing Sheets

SLIDER WITH AN IMPROVED PROFILE

BACKGROUND OF THE INVENTION

1. Field of the Invention

The present invention relates to a slider having an improved profile. It is used in the reading and/or writing of information on a magnetic support and in particular on hard disks.

2. Description of the Prior Art

FIGS. 1 to 8 relate to the prior art in connection with sliders and more particularly provide a basis for the description of the technical problem associated with the take-off of sliders and their behavior in operation.

FIG. 1 very diagrammatically shows the structure of a slider 10, which has on the face to be placed facing the recording support, two rails or skis 12, 14. A magnetic read and/or write head 16 is placed at the rear of the head. This head can be placed on the edge of the slider (not shown) or on the lower face of one of the sliders. Moreover, there is a chamfer 18 at the front of each ski.

FIG. 2 shows such a slider in the inoperative position on the recording support 20, which is assumed to be a hard disk. When the disk is inoperative, the slider is in contact therewith.

When the disk starts to rotate, the slider rubs on the disk. As soon as the speed reaches a certain threshold (called take-off speed), a tongue of air rushes under the chamfer 8 and consequently creates a lifting force, which brings about the take-off of the slider. This is illustrated in FIG. 3, where the air flow is designated 22.

When the disk rotation speed reaches its nominal level, the slider is in dynamic equilibrium between the lifting force acting on the chamfer and the skis and also a bearing force (indicated by the arrow 24) caused, on the other face of the slider, by a spring (not shown) and which applies a force of 3 to 5 g to the slider.

The angle $\alpha$ formed by the slider with the disk must be as large as possible at the time of take-off in order to ensure rapid head take-off and prevent longer rubbing of the head on the disk. However, if the angle $\alpha$ is too large, the flight or movement stability of the head decreases. Therefore a compromise must be found between these opposing requirements and in practice the angle $\alpha$ is fixed at a few microradians.

Moreover, prior to take-off, a slider is located above the internal tracks of the disk, i.e. on the disk center side, where the tangential speed of the disk is lowest (for a given angular speed). Therefore take-off occurs at low speeds.

It is therefore appropriate to give the chamfer 18 a considerable size in order to ensure a rapid take-off of the head. However, when the head moves towards the median or external tracks of the disk, the tangential speed increases, which has the effect of raising by the same amount the slider, thus increasing the angle $\alpha$ and therefore making head flight unstable.

FIG. 4 shows the evolution of the angle $\alpha$ as a function of the radius r of the overflown track. The angle $\alpha_1$, obtained for the external radius Rext, is the maximum angle which can be accepted for a correct flight or movement of the head. The angle $\alpha_0$ is the angle obtained for the internal radius Rint. If the chamfer had been optimized to obtain the value $\alpha_1$ for the internal radius, there would certainly have been a rapid head take-off for the internal radius, but as soon as the head moved towards the external tracks, the angle $\alpha$ would have reached values no longer complying with standards and the slider stability would have decreased.

In order to obtain a necessary lift at take-off, it must be noted that a chamfer at the front of the skis is not the only solution. It is also possible to machine a step or indentation, which is often simpler.

Thus, FIG. 5 diagrammatically shows two embodiments of the slider, i.e. with a chamfer 18, or with a step or stair 19. Such sliders are described in numerous documents, e.g. U.S. Pat. No. 4,673,996 and European patent 543 690.

The presence of a step at the front of the skis has the effect of creating an overpressure beneath the ski and which is located very close to the step. This is illustrated by FIG. 6, where the bottom diagram shows the overpressure P along the longitudinal axis of the ski and the top diagram the position of the slider. It can be seen that the over-pressure passes through a maximum 21 level with the riser 23 of the front indentation.

In order to optimize the efficiency of the step, its height (i.e. the height of the riser) should be adapted to the relative speed between the disk and the slider at which it is wished to create the overpressure. Thus, at a low speed, e.g. approximately 3 m/s, the step height will be approximately 100 nm. For a speed of about 10 m/s, the step height will be approximately 800 nm.

In the frequently encountered case where a slider must take-off in an internal track of a disk, where the speed is low, a step of limited height will make it possible to create the overpressure appropriate for take-off. However, when the disk speed has reached its nominal level, the limited height step will lose its effectiveness. A step having a greater height would have been more effective.

It is for this reason that it has been proposed to provide the front part of the skis with two steps instead of one. This is shown in FIG. 7, where there is a first step 30 with its riser 31 and a second step 32 with its riser 33. These two steps ensure both a correct take-off above the internal tracks and an appropriate inclination above the external tracks.

A slider having two steps is described in U.S. Pat. No. 3,488,648.

SUMMARY OF THE INVENTION

The object of the invention to provide a slider, which once again uses the known two step or stair arrangement, but which permits an even faster take-off for a lower speed of the head, but without requiring at high speed (external track, nominal rotation speed) an excessive angle which would be prejudicial to the movement stability of the head.

Thus, the invention makes it possible to obtain, for an internal track and at low speed, an angle close to the optimum value $\alpha 1$ and maintain said angle for an external track and at high speed. The fact of having an angle $\alpha 1$ in the internal track permits a faster take-off of the head, so that it does not rub for a longer period on the disk and consequently reduces wear.

The invention therefore recommends giving the two steps a particular profile, namely a certain obliqueness with respect to the transverse direction of the ski. In the prior art, the riser or risers were always transverse. However, the direction of the tongues of air beneath the ski is not always perpendicular to the riser, because the slider is not always directed tangentially to the tracks. The invention takes advantage of this observation by inclining the risers with respect to the transverse direction of the slider, so that the lifting conditions are of an optimum nature both at the time of take-off (when the riser is above the internal tracks) and in normal flight or movement (when the riser is above the external tracks).

Instead of speaking of the obliqueness of the risers with respect to the transverse direction of the skis, it is possible to refer to the inclination of the risers with respect to the longitudinal direction of the slider. This inclination is no longer 90°, as in the prior art, but is instead smaller. An angle is chosen between 10° and 60° for the first riser (e.g. 30° or 45°) and an angle between approximately 20° and 80° for the second (e.g. 45° or 60°).

More specifically, the present invention relates to a slider for magnetic recording, comprising at least one ski with a front portion and a rear portion, read and/or write means located to the rear of the slider, the front portion of each ski having a first and a second steps with, respectively, a first and a second risers, said slider being characterized in that the first riser of the first step forms with the longitudinal direction of the ski a first angle between approximately 10° and approximately 60° and in that the second riser of the second step forms with the longitudinal direction of the ski a second angle, which differs from the first, and is between approximately 20° and approximately 80°.

Advantageously, the height of the first riser is between approximately 20 nm and approximately 200 nm and the height of the second riser is between approximately 200 nm and approximately 2 μm.

In the invention, the read and/or write head is located to the rear of the slider, either on the edge of the slider, as shown in FIG. 1, or is integrated onto one of the skis, as described in the aforementioned EP-A-543 690. Such heads are obtained by processes for depositing and etching thin films used in microelectronics.

The slider according to the invention may only have a single ski, or can have two or more. If it has several skis, the slider can have one or more read and/or write heads.

In addition, various indentations, chamfers, etc. can be provided around the skis or to the rear, in accordance with the arrangements described in the two above-cited documents.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DESCRIPTION OF THE PREFERRED EMBODIMENTS

Figure 8:
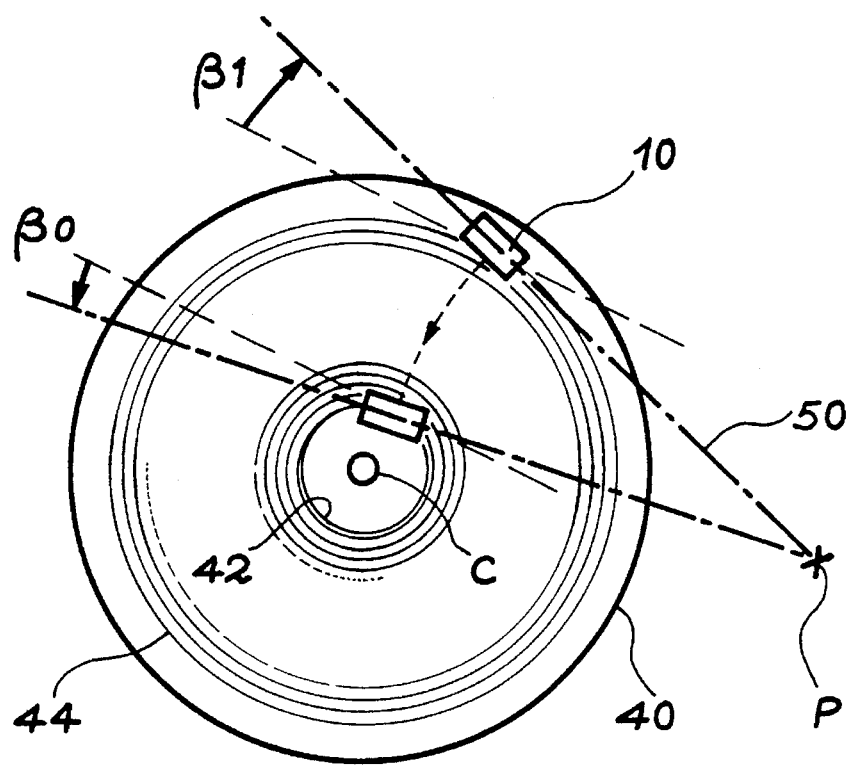
FIG. 8 illustrates the orientation variation of a slider with respect to a direction tangential to a disk, as a function of the position of the slider with respect to the disk.

FIG. 8 shows a hard disk media 40 with a center C and recording tracks between an internal circumference 42 of radius Rint and an external circumference 44 of radius Rext.

A support device for a slider 10, which is not shown in detail, comprises an arm 50 articulated about a pivoting point P.

When the slider is located in the central zone of the disk, the longitudinal direction of the slider forms an angle $\beta 0$ of approximately −6° with respect to the tangent to the recording track. When the slider is on the periphery of the disk, the longitudinal direction thereof forms an angle $\beta 1$ with the tangent to the track of approximately 15° (the angles are counted positively in the trigonometric sense starting from the tangential direction).

Figure 9:
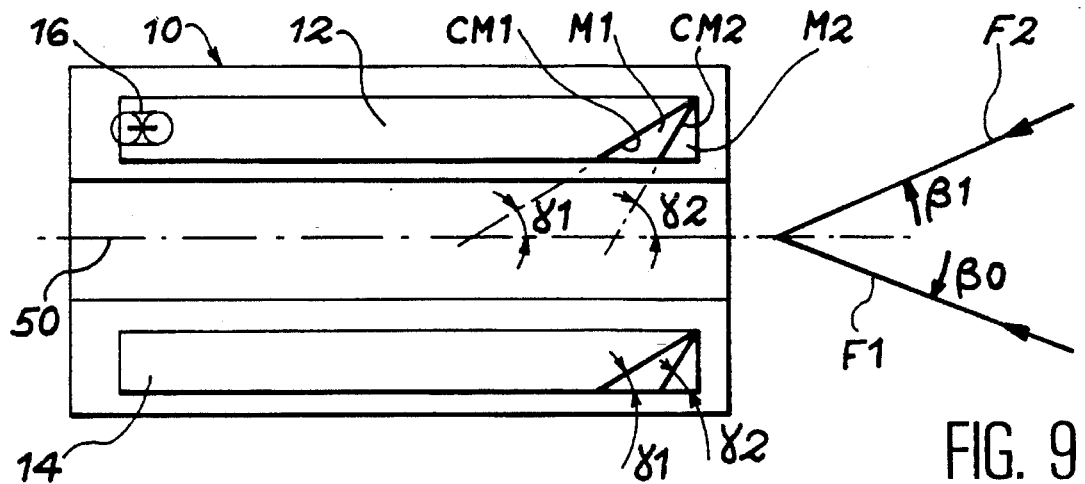
FIG. 9 shows a slider according to the invention viewed from below.

FIG. 9 shows a slider 10 with two skis 12, 14 and a read and/or write head 16. According to the invention, the slider has a lower air bearing surface which confronts the media 40; comprises two oblique steps or stairs located to the front of each ski, namely a first step M1 with its riser CM1 and a second step M2 with its riser CM2. FIG. 9 also shows the orientation of the risers CM1 and CM2 with respect to the longitudinal direction 50 of the slider (or, what amounts to the same thing, each ski). The first riser CM1 forms an angle $\alpha 1$ to said direction and the second CM2 an angle $\alpha 2$, each angle being in planes substantially parallel to a lower air bearing surface of the slider which confronts the media 40. The surface of first step M1 lies in a plane which is substantially parallel to the plane of the surface of second step M2, as is shown in FIG. 10.

FIG. 9 also shows the direction of the air flows acting on the sliders. When the slider is in the internal position, the air flow F1 forms an angle $\beta 0$ (approximately −6°) with the longitudinal direction, in accordance with what was stated in connection with FIG. 8. When the slider is in the external position, the flow F2 forms an angle $\beta 1$ (approximately 15°) with said same direction.

Figure 10:
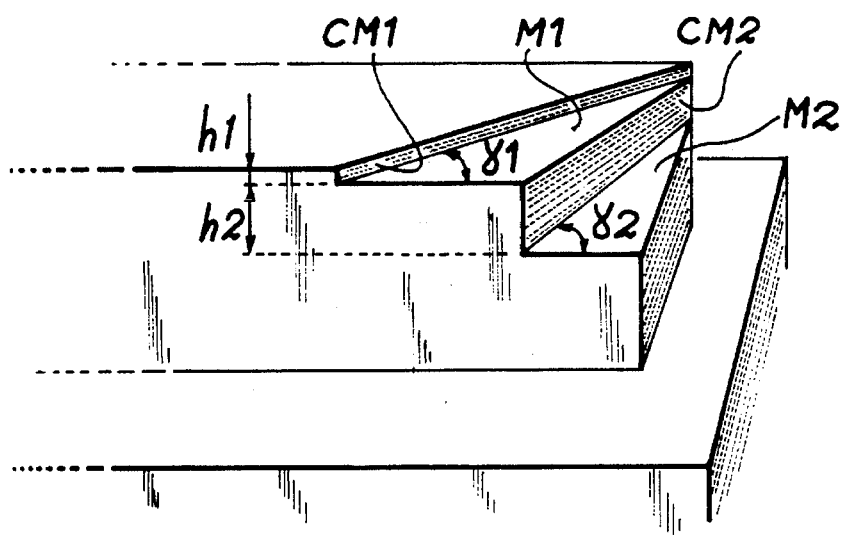
FIG. 10 is a perspective view of the front end of a ski according to the invention.

FIG. 10 shows in greater detail the shape of the two steps or stairs and clearly shows the inclination of the risers CM1 and CM2. In FIG. 10 the dimensions are not to scale (in practice, the second step is approximately ten times higher than the first).

The operation of the slider according to the invention is then as follows. In the internal position, above tracks located close to the center of the disk, the air entrained by the rotation of the disk encounters the riser CM1 which, due to its inclination, has a considerable width and forms an effective front with respect to the air direction F1. This front is not at 90° to the flow axis as in the prior art, which would make its width inadequate and would reduce its effectiveness. Therefore the first step is particularly effective during take-off.

In the external position, the air flow takes the direction F2 inclined by an angle $\beta 1$ and the counterstep CM1 is now attacked virtually tangentially and no longer frontally as with the flow M1. It is then that the second riser CM2 fulfills its function. However, its width is smaller than the first riser and its inclination with respect to the flow F2 is not very great. For these two reasons the second step, which has the more important function during the movement of the head above the peripheral portions of the disk, will maintain the inclination of the slider at an appropriate value and will avoid excessive inclinations which would prejudice the stability of the slider.

The heights h1 and h2 of the risers CM1, CM2 are regulated in accordance with the conditions of use, but are generally between 20 and 200 nm for the first and 0.2 and 2 μm for the second.

Figure 1:
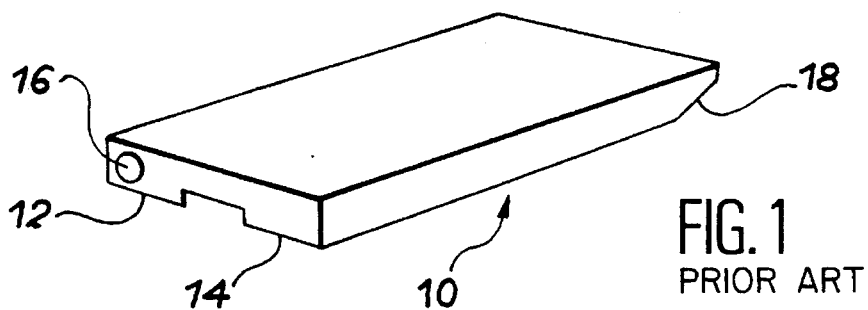
FIG. 1 shows the general structure of a slider.
Figure 2:
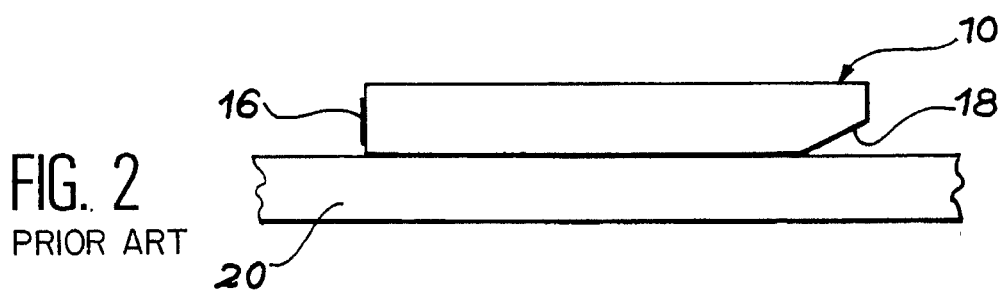
FIG. 2 shows a slider resting on a recording support.
Figure 3:
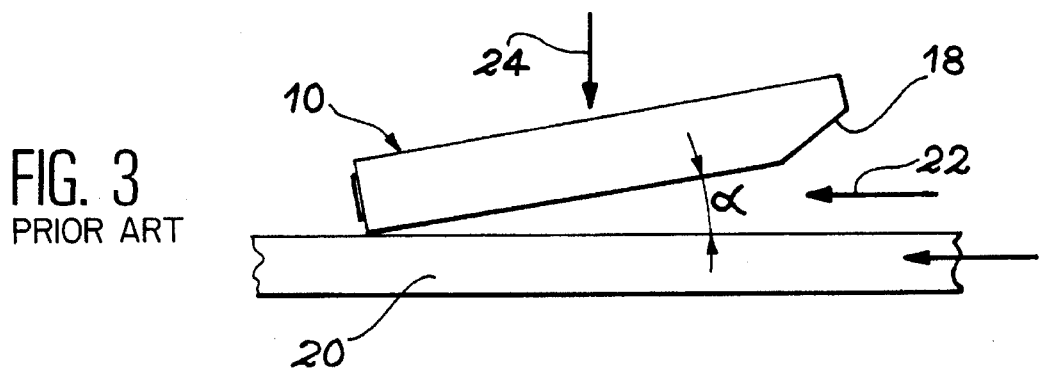
FIG. 3 illustrates the take-off of a slider.
Figure 4:
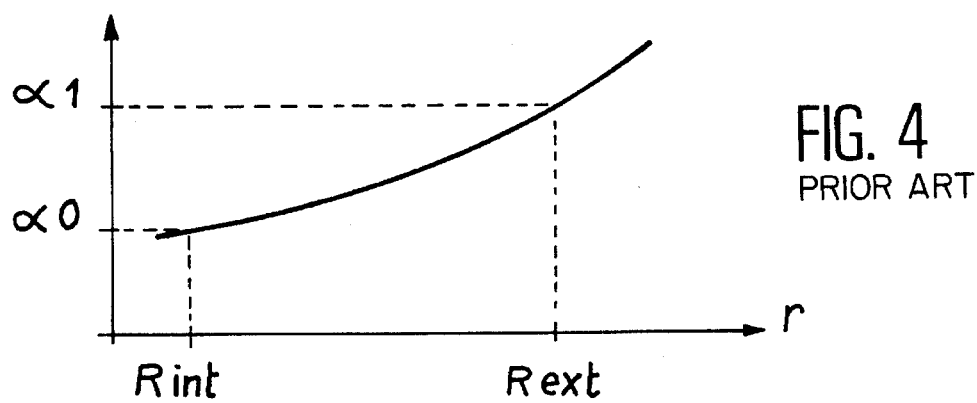
FIG. 4 shows the variation of the slider inclination as a function of its position along the radius of the recording disk.
Figure 5A:
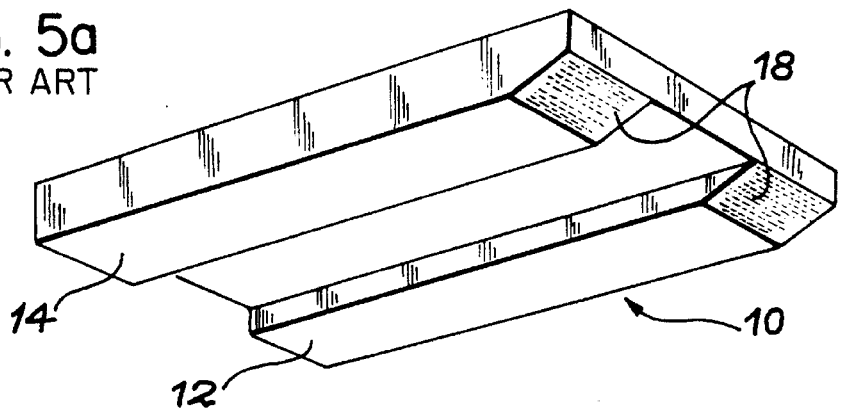
FIG. 5, parts a and b, shows sliders having chamfers and steps.
Figure 5B:
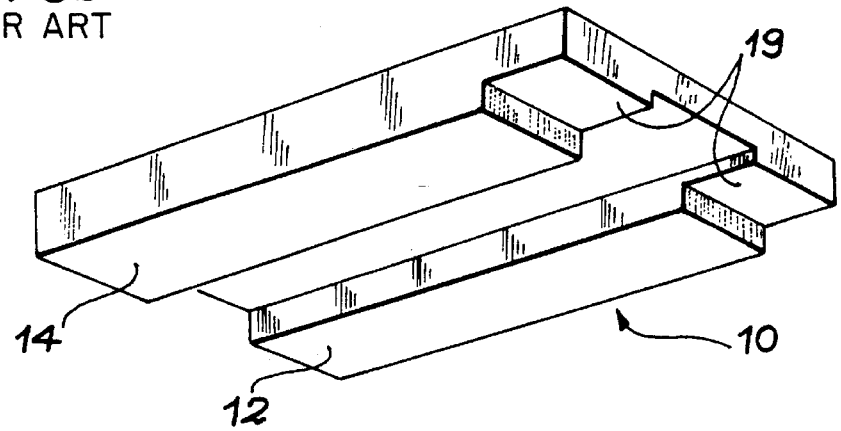
Figure 6:
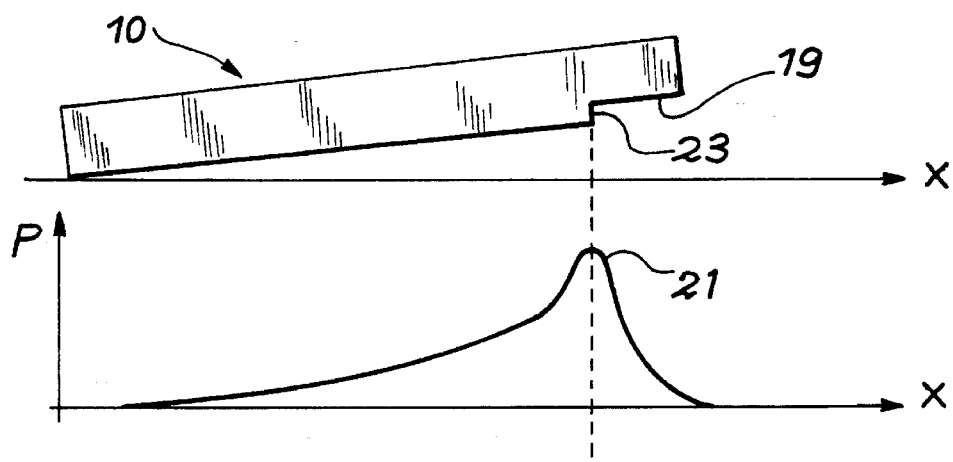
FIG. 6 shows the distribution of the overpressure beneath a ski having a step in its front portion.
Figure 7:
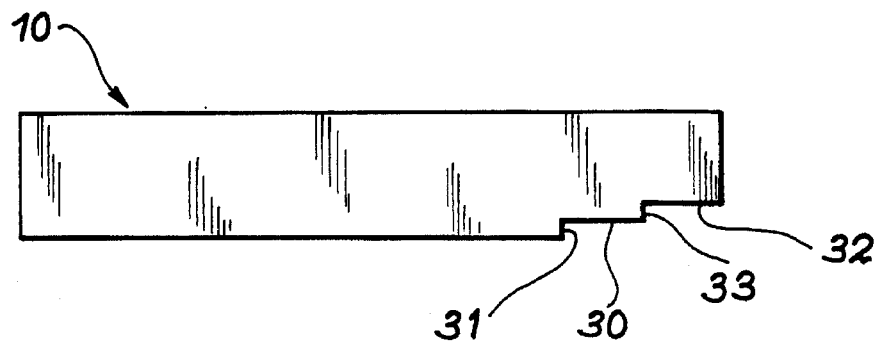
FIG. 7 shows a slider having two steps.
Figure 11:
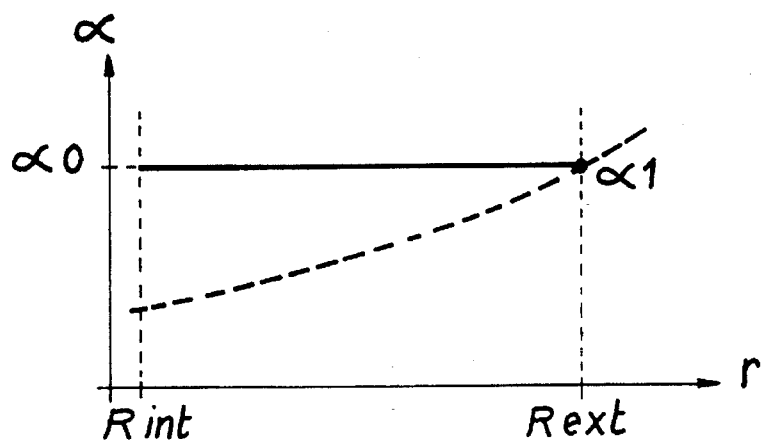
FIG. 11 shows the variation of the inclination angle of a slider according to the invention as a function of its radial location on the disk.

Finally, FIG. 11 shows the variation of the inclination angle $\alpha$ of a slider according to the invention as a function of its radial position on the disk. When the slider is towards the center at Rint, the angle $\alpha 0$ is already high (higher than in the prior art, cf. FIG. 4, whose curve is shown in broken line form in FIG. 11), which permits a very fast take-off of the slider despite the low speed. However, there is essentially no change to this angle when the slider moves away from the center and reaches the peripheral regions towards Rext, where the speed is much higher. The value $\alpha 1$ obtained at the exterior is equal to or substantially equal to $\alpha 0$.

In order to obtain the particular profile of the steps according to the invention, it is possible to use any known machining or more advantageously etching procedure. It is possible to work through masks placed on the skis. It would appear advantageous to first etch the second step through a first mask and then, through a second mask, produce the first step, while completing the etching of the second.

We claim:

1. A slider for magnetic recording, having a rear portion wherein slider comprises:

at least one ski with a front portion and a rear portion, a read and/or write head located at the rear portion of the slider, the front portion of each ski having first and second steps with, respectively, first and second risers, wherein the first riser of the first step and a longitudinal direction of the ski form a first angle of between approximately 10° and approximately 60°, the second riser of the second step and the longitudinal direction of the ski form a second angle, which differs from the first angle and is between approximately 20° and approximately 80° and wherein each of said angles are in planes which are substantially parallel to a lower air bearing surface of the slider which confronts a media.

2. A slider according to claim 1, wherein the height of the first riser is between approximately 20 nm and approximately 200 nm and the height of the second riser is between approximately 200 nm and approximately 2 μm.

3. A slider according to claim 1, wherein the first step lies in a plane which is substantially parallel to that of the second step.

4. A slider according to claim 1, wherein the first riser is substantially perpendicular to the surface of the first step and the second riser is substantially perpendicular to the second step.

* * * * *